United States Patent
Parthasarathy et al.

(10) Patent No.: US 11,450,936 B2
(45) Date of Patent: Sep. 20, 2022

(54) TRANSMISSION OF DATA OVER CONDUCTING WIRES

(71) Applicant: Intel Corporation, Santa Clara, CA (US)

(72) Inventors: Ramaswamy Parthasarathy, Bangalore (IN); Punit Ashok Rathod, Bangalore (IN); Jayprakash Thakur, Bangalore (IN); Arvind Sundaram, Bangalore (IN); Ajay Sharma, Bangalore (IN); Nikita Bipin Ambasana, Bangalore (IN); Satish Ramachandra, Bangalore (IN); Vishram Shriram Pandit, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 16/948,578

(22) Filed: Sep. 24, 2020

(65) Prior Publication Data
US 2021/0203053 A1 Jul. 1, 2021

(30) Foreign Application Priority Data
Dec. 26, 2019 (IN) .............................. 201941053993

(51) Int. Cl.
*H01P 3/12* (2006.01)
*H04B 3/52* (2006.01)

(52) U.S. Cl.
CPC .................... *H01P 3/12* (2013.01); *H04B 3/52* (2013.01)

(58) Field of Classification Search
CPC ..... H01P 3/12; H01P 3/10; H01P 3/02; H04B 3/52
See application file for complete search history.

(56) References Cited

U.S. PATENT DOCUMENTS

| | | | |
|---|---|---|---|
| 10,951,266 B1 * | 3/2021 | Wolniansky | H01Q 13/24 |
| 2005/0030102 A1 * | 2/2005 | Landolt | H01P 3/02 |
| | | | 330/286 |

(Continued)

OTHER PUBLICATIONS

M. N. Alam et al, "Novel Surface Wave Exciters for Power Line Fault Detection and Communications", 2011 IEEE International Symposium on Antennas and Propagation (APSURSI), Date of Conference: Jul. 3-8, 2011, pp. 1139-1142, Publisher: IEEE.

(Continued)

*Primary Examiner* — Khanh C Tran
(74) *Attorney, Agent, or Firm* — Iphorizons PLLC; Narendra Reddy Thappeta

(57) ABSTRACT

A communication system communicates data elements on a conducting wire. In an embodiment, a sequence of data elements to be transmitted is electrically represented on a pair of terminals, and a transmission element located at a first portion of the conducting wire transmits the sequence in the form of a wave on a surface of the conducting wire. The transmission element includes a first conductor wrapped around the first portion of the conducting wire, a first insulator located between the first conductor and the first portion of the conducting wire, and a conductive structure disposed around the first conductor. The conductive structure has a narrow cross section at one end and extends outwardly to a broader cross section at the other end. A first terminal of the pair of terminals is electrically connected to the first conductor and the second terminal is electrically connected to the conductive structure.

20 Claims, 8 Drawing Sheets

(56) References Cited

U.S. PATENT DOCUMENTS

| | | | | |
|---|---|---|---|---|
| 2011/0083877 A1* | 4/2011 | Sugiyama | ............ | H01B 7/0823 |
| | | | | 427/117 |
| 2013/0109317 A1* | 5/2013 | Kikuchi | .................. | H01P 5/087 |
| | | | | 455/41.2 |
| 2017/0018332 A1* | 1/2017 | Barzegar | .................. | H04B 3/54 |
| 2019/0013837 A1* | 1/2019 | Henry | ................ | H01Q 13/0208 |

OTHER PUBLICATIONS

A.P. King, "The Radiation Characteristics of Conical Horn Antennas", Proceedings of the IRE, Date of Publication: Mar. 1950, pp. 249-251, vol. 38, Issue: 3, Publisher: IEEE.

Glenn Elmore, "Introduction to the Propagating Wave on a Single Conductor", Jul. 27, 2009, 30 Pages.

Georg Goubau, "Single-Conductor Surface-Wave Transmission Lines", Proceedings of the IRE, Date of Publication: Jun. 1951, pp. 619-624, Publisher: IEEE.

S K Chatterjee, P Madhavan, "Propagation of Microwaves on a Single Wire—Part I", Journal of the Indian Institute of Science, 1955, pp. 200-223, vol. 37, No. 3.

Skanda Kotethota et al, "Feasibility of Single Wire Communication for PCB-level Interconnects", 2017 IEEE 21st Workshop on Signal and Power Integrity (SPI), Date of Conference: May 7-10, 2017, 04 Pages, Publisher: IEEE.

\* cited by examiner

"TRANSMISSION OF DATA OVER CONDUCTING WIRES"

PRIORITY CLAIM

The instant patent application is related to and claims priority from the co-pending India nonprovisional patent application entitled, "TRANSMISSION OF DATA OVER CONDUCTING WIRES", Serial No.: 201941053993, Filed: Dec. 26, 2019, which is incorporated in its entirety herewith.

BACKGROUND

Technical Field

Aspects of the present disclosure relate generally to data communication, and more specifically to transmission of data over conducting wires.

Related Art

Conducting wires are characterized by low resistance to flow of electrons, and thus are often used for carrying electrical signals. Due to the low resistance, metals such as copper, aluminum are used for forming such conducting wires, as is well known in the relevant arts.

One example of such conducting wires is power lines, which are used for transmission of electrical power (Alternating Current or Direct Current) over long distances covering potentially many miles. The power lines are typically constituted of conductive solid materials in the form of cables.

Aspects of the present disclosure are directed to transmission of data over conducting wires.

BRIEF DESCRIPTION OF THE VIEWS OF DRAWINGS

Example aspects of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
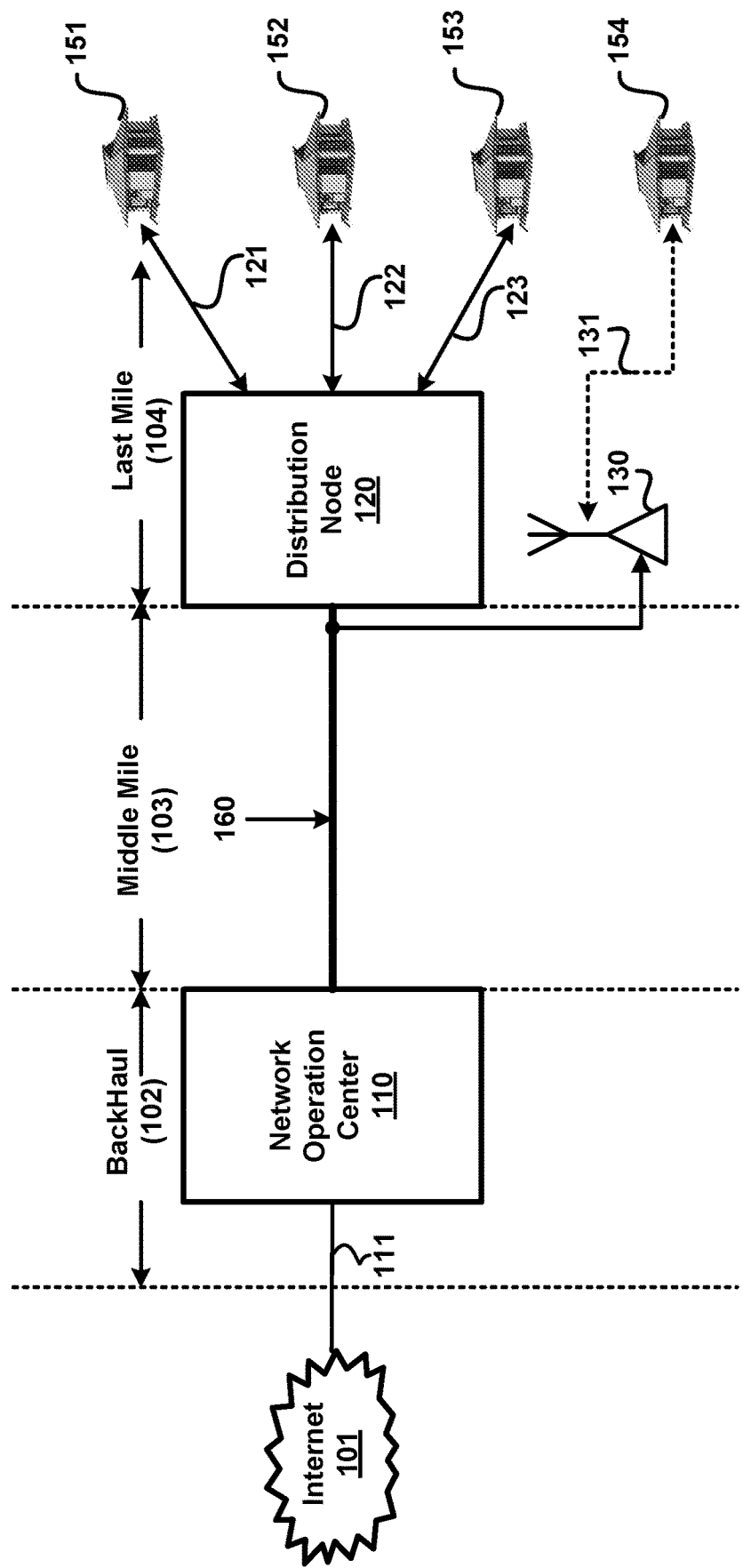
FIG. 1 is a block diagram of an example environment in which several aspects of the present disclosure can be implemented.

A communication system provided according to an aspect of the present disclosure communicates (transmit and/or receive) data elements on a conducting wire. In an embodiment, each of a sequence of data elements to be transmitted is electrically represented on a pair of terminals, and a transmission element located at a first portion of the conducting wire transmits the sequence of data elements in the form of a wave on a surface of the conducting wire. The transmission element includes a first conductor wrapped around the first portion of the conducting wire, a first insulator located between the first conductor and the first portion of the conducting wire, and a conductive structure disposed around the first conductor. The conductive structure has a narrow cross section at one end and extends outwardly to a broader cross section at the other end. A first terminal of the pair of terminals is electrically connected to the first conductor and the second terminal is electrically connected to the conductive structure.

A receiver element may also have a similar structure as the transmitter element and receive a wave representing the data elements. In an embodiment, the wave is a transverse magnetic (TM) wave and the receiver converts the TM wave to a transverse electromagnetic (TEM) wave. A data sink thereafter recovers the data elements from the TEM wave. In such an embodiment, a data source may transmit the data elements on the pair of terminals in the form of a TEM wave, and the transmission element (mounted on the first portion) converts the TEM wave to TM wave, which is propagated as a surface wave on the conducting wire and the TM wave is received by the receiver element mounted on a second portion of the conducting wire.

According to another aspect, each combination of a data unit and a communication element (comprising a transmission element and/or a receiver element) is referred to as a transceiver. In one embodiment, several transceivers may be mounted sequentially over an entire length of the conducting wire and such transceivers may be dispersed along the length of the conducting wire the one or more transceivers may be separated by a distance ("separation distance").

An example embodiment is described below in the context of a power line, though similar techniques may be practiced with other conducting wires. While the power lines are often substantially of the cylindrical form, other shaped conducting wires can be used in alternative embodiments without departing from the scope and spirit of several aspects of the present disclosure.

Several aspects of the present disclosure are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the disclosure.

2. Example Environment

FIG. 1 is a block diagram illustrating the details of an example environment in which several aspects of the present disclosure can be implemented. The environment is shown containing various sections of a broadband data communication system. The details below are provided in the context of a broadband communication system merely as an example. However, several aspects of the present disclosure can be implemented in other environments as well as would be apparent to one skilled in the relevant arts.

Merely for illustration, only representative sections/components are shown in FIG. 1 as being sufficient for understanding the disclosure provided herein. Typically, however, more components may be present in such a system. FIG. 1 is shown containing internet 101, backhaul 102, middle mile 103 and last mile 104 termed as respective section. Each of these sections may contain one or more processing entities not all of which are shown in the interest of clarity. Each of the sections is now described below.

Internet 101 represents a wide area network such as the World Wide Web. Internet 101 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 101. When the packet contains content such as port numbers, which specifies the target application, the packet may be said to be directed to such application as well.

Backhaul 102 generally refers to the side of the broadband communication system that communicates with the global Internet (indicated in FIG. 1 by Internet 101), and is typically paid for at wholesale commercial access rates to or at an Internet exchange point or other core network access location. Backhaul 102 terminates at Network Operation Center (NOC) 110 implying that the data from internet 101 for end users is available for transmission at NOC, and data from end users to internet 101 is to be received at NOC 110. Although only a single wire 111 is shown connecting internet 101 and Network operation Center 110, backhaul 102 may include wired, fiber optic and wireless components. Wireless sections (not shown) may include using microwave bands and mesh and edge network topologies that may use a high-capacity wireless channel to get packets to the microwave or fiber links. Network operations center 110, also known as a "network management center", represents one or more locations from which network monitoring and control, or network management, is exercised over the broadband communication system.

Middle mile 103 represents the segment of a broadband communication system network that links a network operator's core network (e.g., NOC 110) to the local network plant, typically situated in the telecom company's central office (also termed telephone exchange). In FIG. 1, distribution node 120 and wireless base station 130 located at the beginning of last mile 104 may represent the central office. In FIG. 1, middle mile 103 is shown containing a cable 160 formed of several strands of thick copper wires twisted together to form the cable (conducting wire in general). However, typically, rather than a single cable 160, the communication medium in middle mile 103 may be in the form of one or more of fiber, cellular and satellite links. According to an aspect of the present disclosure, a power line is used as the communications medium in middle mile 103, as described below in detail. Backhaul 102 and middle mile 103 may carry data in aggregated form, for example, data of several hundreds of users.

Last mile 104 refers to the final leg of the broadband communication system that delivers telecommunication services to retail end-users (customers) or end-user systems. More specifically, the last mile describes the portion of the communication system chain that physically reaches the end-user's premises. Distribution node 120 and wireless base station 130 represent the beginning of last mile 104. Data in aggregated form (representing several hundreds of users' data) from NOC 110 are received by distribution node 120 and wireless base station 130, and routed to the corresponding end-users. Similarly, distribution node 120 and wireless base station 120 receive data from multiple end users, aggregate the data and transmit the data to NOC 110. FIG. 1 shows four end users (or corresponding computer systems) 151, 152, 153 and 154, three of which are linked to distribution node 120 by wired paths 121, 122 and 123, and one of which is linked to base station 130 by a wireless path. Wired paths 121, 122 and 123 may correspond to fiber, coaxial cable and twisted-pair copper wire.

Due to lack of feasible solutions in middle mile 103, providing cost-effective broad-band data connectivity may be a challenge in many environments/countries. For example, in India, over 750 million people do not have primary internet broadband connection. The biggest challenge, especially, to provide rural connectivity (from a more populated hub infrastructure location to a remote village located 1 to 5 kilometers away) is lack of fiber connectivity, wired ethernet or Line of Sight (LoS) microwave link and enabling infrastructure (towers, relays). Further, low Average Revenue Per User (ARPU) and low tele-density in these areas result in lesser Return on Investment (ROI) for telecom companies to invest in the added infrastructure required. These existing technologies have higher installation complexity and time requirements.

According to an aspect of the present disclosure existing infrastructure in the form of power lines are used to carry data in middle-mile 103. The manner in which data-carrying wires are coupled to a power line according to aspects of the present disclosure is described next in detail.

3. Transmitting Data on a Power Line

According to an aspect of the present disclosure, a transmission element is used to couple data to a power line while simultaneously providing isolation between the circuits of the low-voltage data transmitter/receiver and the high-voltage power line. FIG. 2 is a block diagram illustrating a transmission element and its coupling to a power line. It may be appreciated that the power line carries the AC or DC electrical power over long distances, in addition to providing for data transmission simultaneously according to the features of the present disclosure. In FIG. 2, the combination of a data unit and a communication element (transmission element and/or communication element) may together be viewed as a transceiver. Thus, in FIG. 2, three transceivers are shown. A first transceiver is formed by the combination of data unit 201 and transmission element 270. A second transceiver is formed by the combination of data unit 260 and receiver element 280. A third transceiver is formed by the combination of data unit 260 and transmission element 290, wherein it is assumed that data unit 260 in combination with elements 280 and 290 constitutes two transceivers, with each transceiver having a transmitter and a receiver.

Data unit 201 represents a low-voltage circuit/component as may be provided at an output of NOC 110 for transmitting/receiving data to/from power line 160 in middle mile 103. Data unit 201 generates/receives modulated carrier signals (for example, single carrier or multi-carrier as in orthogonal frequency division multiplexing/OFDM) across a pair of electrical terminals/wires 202 and 203. In an embodiment, terminals 202 and 203 are the terminals in a coaxial cable, with the inner conductor of the cable carrying the signal and the outer sheath of the cable carrying the signal return (or ground). Data unit 260 is implemented similar to data unit 201, and represents the low-voltage circuit/component at the end of the middle-mile 103, and as may be contained in or connected to distribution node 120 or wireless base station 130 of FIG. 1. Data unit 260 receives/generates modulated carrier signals (for example, single carrier or multi-carrier as in orthogonal frequency division multiplexing/OFDM) across a pair of electrical terminals/wires 281 and 282. Terminals 281 and 282 are respectively connected to the outermost conductor of the inner cylinder of receiver element 280, and the hollow conical structure of receiver element 280. When a data unit (201 or 260) transmits data, the data unit may be referred to as a data source. When a data unit (201 or 260) receives data, the data unit may be referred to as a data sink.

Transmission element 270 and receiver element 280 are used to couple data units 201 and 260 to power line 160. It should be appreciated that each of elements 270 and 280 can operate as both transmitter and receiver of data elements (with similar structure and connections), though the elements are described as transmission element and receiver element respectively for illustration. For conciseness, only the details of transmission element 270 are shown in cut-away section in FIG. 2, though receiver element 280 may also be similarly constructed. Further, the sizes of both elements 270 and 280 may be the same, although element 280 is shown to be smaller in size than element 270. Transmission elements and receiver elements may be in general be termed communication elements. Further, it is noted that transmission element 270 is located at a 'first portion' of power line 160. The first portion has a length approximately equal to the length of the conical structure 220, Thus, the length of a first portion is substantially shorter than the length of power line 160. Similarly, receiver element 280 is located at a second portion of power line 160. Again, the length of the second portion is approximately equal to the length of the conical structure used in receiver element 280, and is also substantially shorter than the length of power line 160.

Transmission element 270 is shown containing a hollow inner cylinder 230 with four layers. Layers 210 and 212 of the cylinder are made of conducting material such as, for example, copper or brass. Layers 211 and 213 are made of insulating material (e.g., plastic). In FIG. 2, the conducting layers are shown with crossed filling and the insulating layers are shown with dotted filling. Inner cylinder 230 is wrapped around the power line, implying that the inner cylinder spatially encircles the power line. In addition, insulating layer 213 is shown contacting power line 160.

Figure 3:
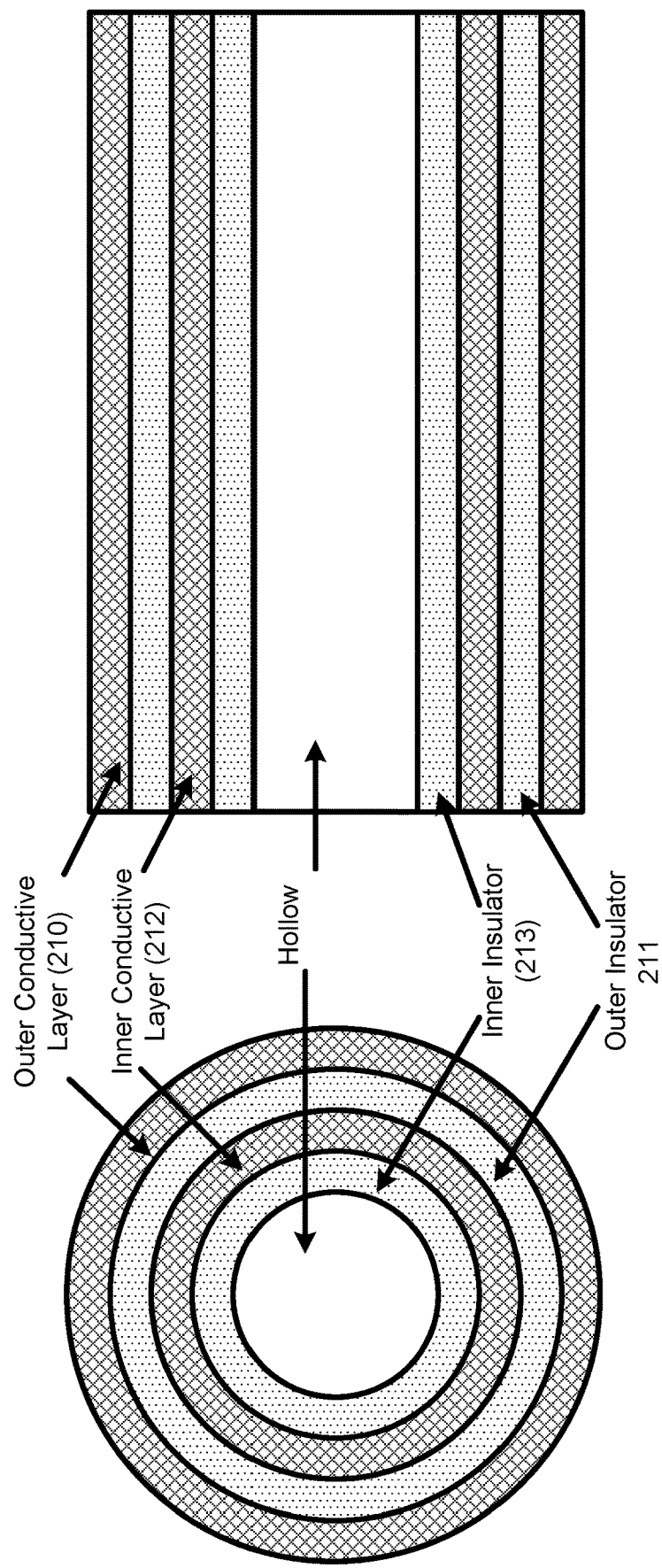
FIG. 3 is a diagram illustrating a cross sectional view and a side cut-away view of an inner cylinder of a communication element in an embodiment of the present disclosure.

FIG. 3 further illustrates the details of inner cylinder 230, which is shown in cross section and side cut-away views. In an embodiment, hollow inner cylinder has a length of 40 millimeters (mm). In FIG. 3, the conducting layers are shown with crossed filling, the insulating layers are shown with dotted filling, and hollow regions are shown with no filling.

Figure 2A:
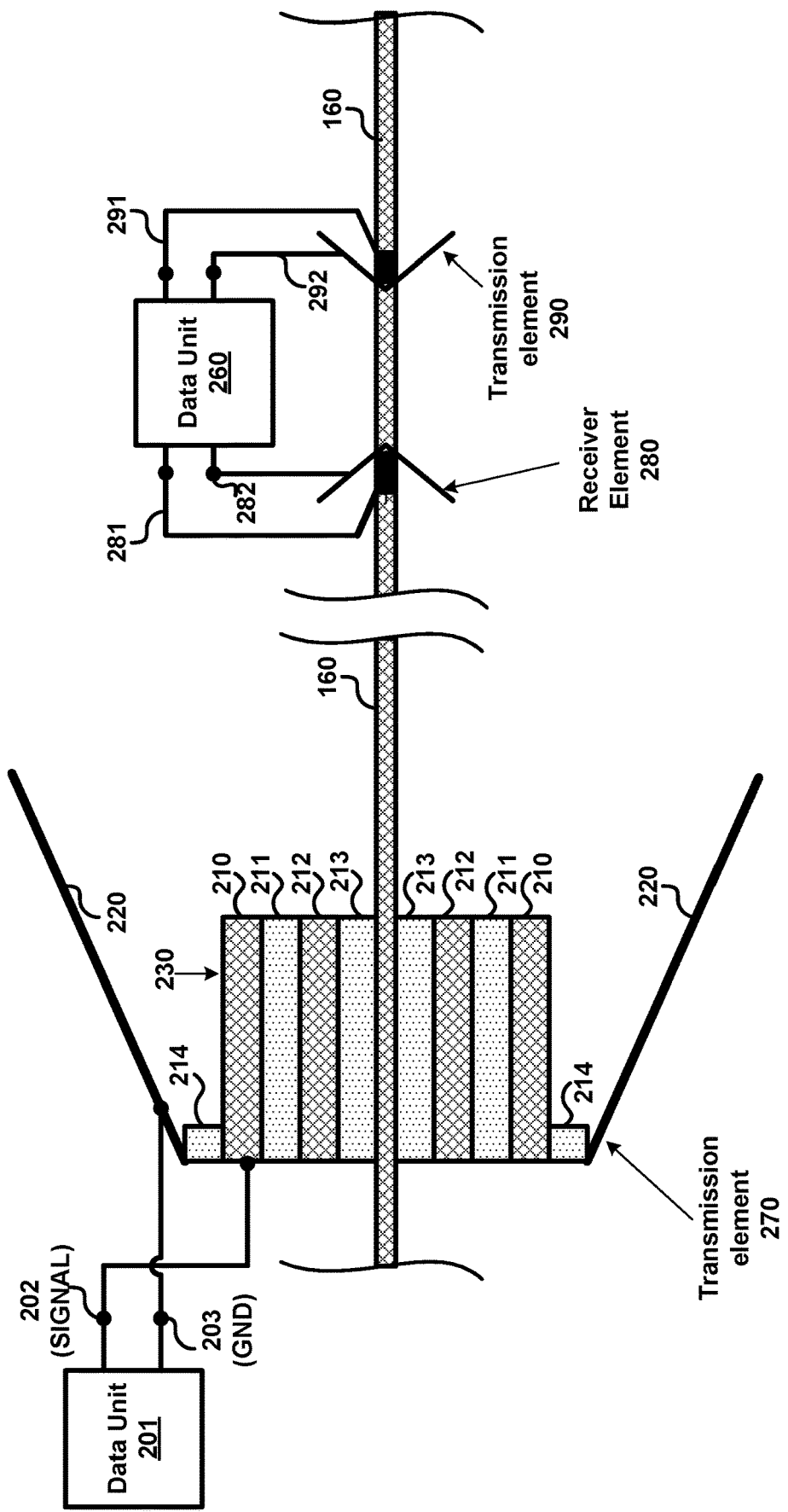
FIG. 2A is a block diagram illustrating the manner in which multiple sets of communication element pairs (transmission element and receiver element) are coupled to a power line, in an embodiment of the present disclosure.
Figure 2B:
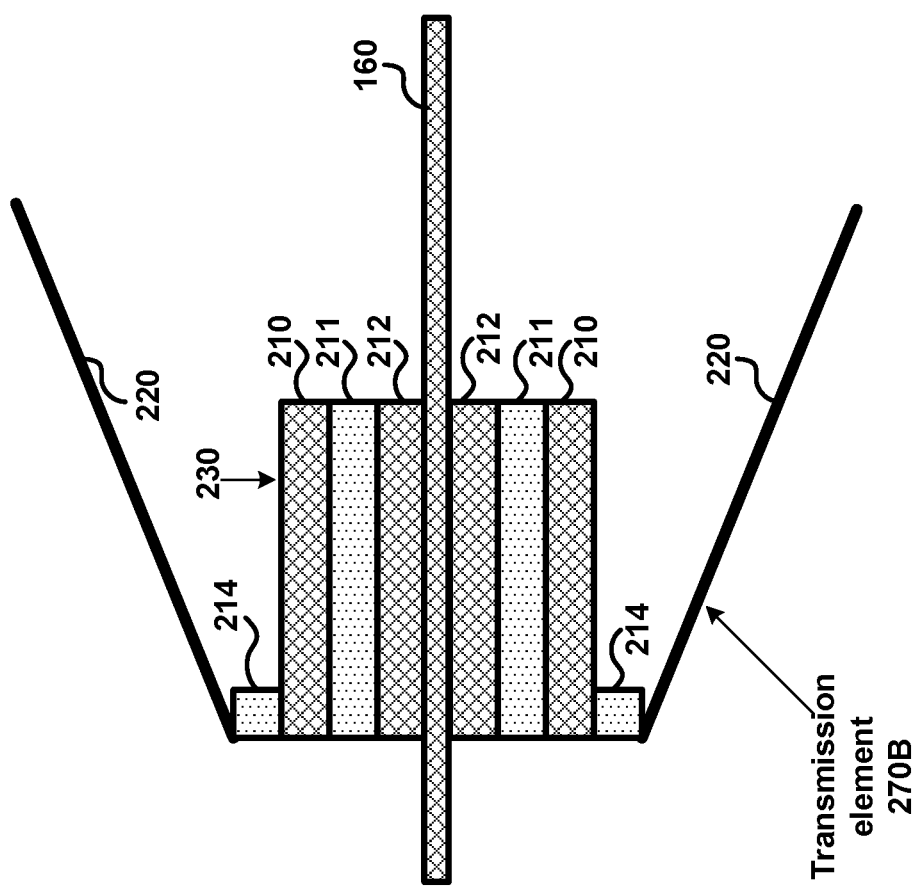
FIG. 2B is a block diagram of illustrating a communication element and its coupling to a power line, in another embodiment of the present disclosure

In another embodiment, a transmission element is designed with only three layers as shown in FIG. 2B. Transmission element 270B of FIG. 2B differs from transmission element 270 in that transmission element 270B does not have the innermost insulating layer 213, but instead has conductive layer 212 directly contacting power line 160.

Transmission element 270 further includes a hollow conical structure 220. The hollow conical section 220 is coupled to the inner cylinder via an insulating ring 214. Although noted here as being of conical shape, in general section 220 can have other hollow shapes so long as it has a narrow cross section at one end and outwardly extending to a broader cross section at the other end. For example, structure 220 can be implemented as a hollow horn with rectangular or square cross section, with the cross section at one end being larger than the cross section at the other end. Another view of conical section 220 is shown in FIG. 4A. In an embodiment, the diameter (d) of the base of the conical section 220 is approximately 200 mm, and the length (l) of the conical section is approximately 156.07 mm.

Figure 4B:
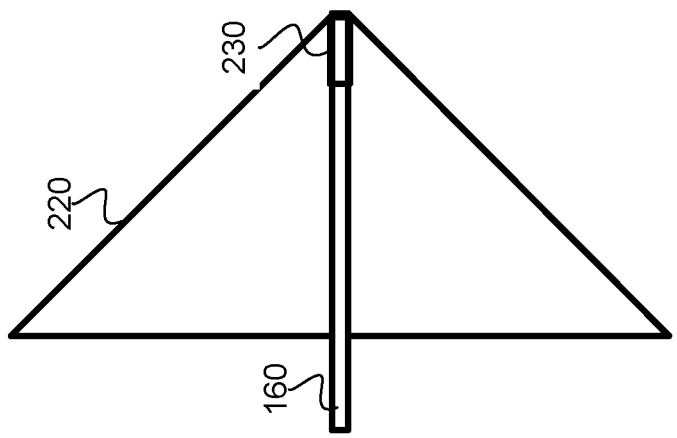
FIG. 4B is a diagram illustrating a communication element coupled to a power line, in an embodiment of the present disclosure.
Figure 4A:
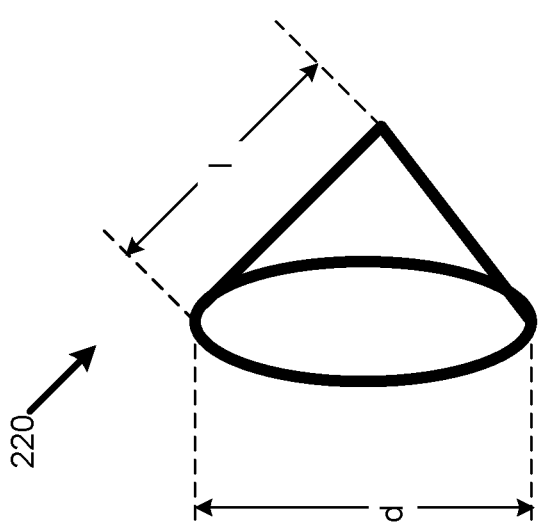
FIG. 4A is a diagram illustrating a conductive conical structure used in a communication element in an embodiment of the present disclosure.

FIG. 4B depicts another view of transmission element 270 coupled to power line 160. In an embodiment, conical section 220 is formed of a flexible 0.5 mm brass sheet cone that can be shaped around power line 160 at the time of installation. Inner cylinder 230 is hinged along the center axis so that it can be closed around power line 160 at the time of installation using a copper sheet.

Terminal 202 (SIGNAL) is electrically connected to conductive layer 210 of the inner cylinder 230. Terminal 203 GND (ground/return) is electrically connected to conical section 220. Thus, it may be appreciated that there is no electrical connection between power line 160 and signal 202/203. As a result, a high level of isolation between the power line 160 and data units 201 and 160 is achieved. Receiver element 280 is similarly coupled to terminals of data unit 260.

In an embodiment of the present disclosure, power line 160 is a 11Kilovolts section of AC power line of an electric power distribution system. The carrier frequencies employed by data units 201 and 220 may lie in the 5.75 Giga Hertz (GHz) region of the frequency spectrum (as for example in the case of OFDM signals). However, other regions in the frequency spectrum can also be used with corresponding changes to the dimension of the parts of elements 270 and 280. In general, the dimensions of the components of the elements 270 and 280 would be based on the wavelength of the carrier signals.

The transmission range obtainable may be further extended by employing another pair of transmission element 290 and a corresponding receiver element (not shown). In addition to the pair of transmitters and receivers within data unit 260, data unit 260 may also contain an amplifier internally to amplify the received signal across terminals 281 and 282. The amplified signal is provided as an output by data unit 260 across terminals 291 and 292. Terminals 291 and 292 are respectively coupled to the outermost conductor of the inner cylinder of transmission element 290 and the hollow conical structure of transmission element 290 (similar to the manner in which terminals 202 and 203 are connected to transmission element 270. The total transmission range (distance) can thus be extended using additional pairs of transmission elements and receiver elements.

In general, the separation distance (distance between a transmission element and a corresponding receiver element) depends on the power level that is provided by the data source and the number of bends in the power lines. If the two ends of a middle-mile are far apart, then a sequence of such communication element pairs can be used as described above.

In an embodiment, conical sections used in elements 270 and 280 have a sufficient height surrounding the inner cylinder. The length of the cone may be selected as a function of lambda (approximate wavelength of the carrier signal(s) transporting the data) and is selected to maximize the outer to inner radius ratio while keeping the overall structure within an easy installation limit. The length of the inner cylinder is designed so as to achieve optimum reflection loss. In an embodiment, the length of the cone is made proportional to the wavelength of the carrier signal that is transported on the power line. For the conical structure, it may generally be desirable to maximize the outer radius to inner radius ratio depending on practical aspects of installation. The four layered sandwiched cylinder (in which the innermost insulating layer 213 is optional) with metal-insulator-metal capacitor (formed by layers 210, 211 and 212 of FIG. 2) is designed to couple signal energy (e.g., RF energy) on to power line 160 with maximum efficiency while obtaining isolation between the high voltage power line and the signal units.

The elements 270 and 280 allow energy (e.g., RF energy) of the data signals to be coupled onto power line 160 in a non-intrusive manner. Elements 270 and 280 can be mounted on top of an installed power line without any physical interference to the line. The non-intrusive coupling is achieved by clamping the transmission elements onto the power line without having to make any changes to the line or having any electrical connection between the transmission elements and the power line.

Data communication via power line 160 as described herein utilizes the concept of single wire communication— an 'Electro Magnetic (EM) surface wave propagation' phenomenon on a power line of the power distribution network, as described in the publicly available document titled "Single-Conductor Surface-Wave Transmission Lines", authored by Georg Goubau, published in Proceedings of the I.R.E, 1951, page numbers 619-623, Decimal classification: R117.1. Thus, power line 160 acts as a waveguide in conveying the energy from transmitter to receiver.

As is well known in the relevant arts, if the interface of two homogenous media (the conductive power line 160 and air) is excited by a plane wave (or cylindrical wave front), due to the requirement of continuity of fields in the two different media, the wave propagates along the interface as a surface wave. These surface waves are guided waves as the field components in the radial direction diminish very fast and there is a minimal loss of energy in the direction normal to the interface leading to longer distance of propagation with minimal dielectric or material losses.

Figure 5:
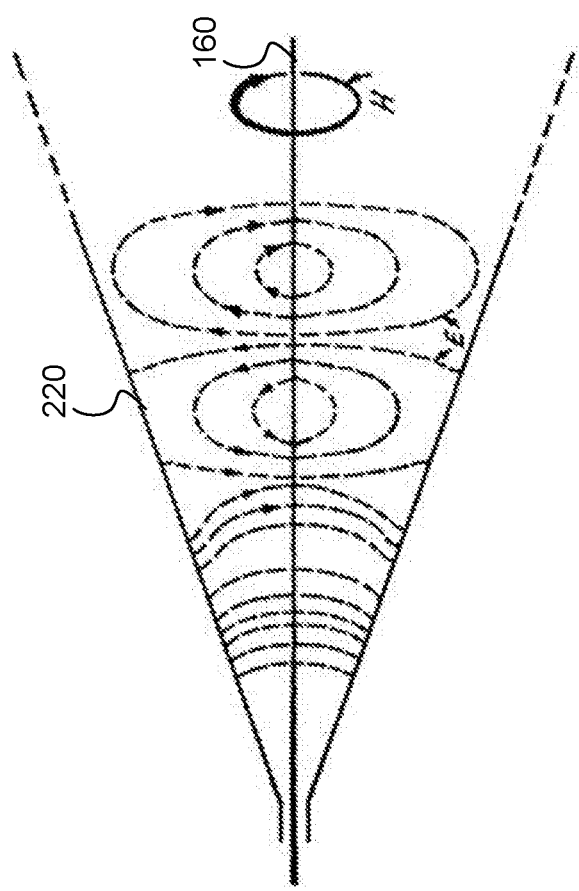
FIG. 5 is a diagram showing the manner in which the E (electric) and H (magnetic) fields take shape inside a transmission element surrounding a conductor.

The cone shape of the conical section 220 provides a gradient conductive surface that facilitates mode conversion from Transverse Electromagnetic (TEM) to Transverse Magnetic (TM) modes by ensuring field continuity at the power line surface, as is well known in the relevant arts. The gradual tapering cone shape connected to the outer conductor (203) of a coaxial cable in conjunction with the twisted strands around a core power transmission line (rabbit cable) create a cylindrical wave front which is the principal mode that propagates along a cylindrical conductor suspended in air. All other wave modes effectively vanish outside the central conductor and hence any other mode of excitation will only cause reduced efficiency of wave propagation in single wire communication. A diagrammatic representation of how the E (electric) and H (magnetic) fields take shape inside a conical launcher (transmission element) surrounding a conductor is shown in FIG. 5. In FIG. 5, H represents the magnetic field, and E represents the electric field of the wave.

Figure 6:
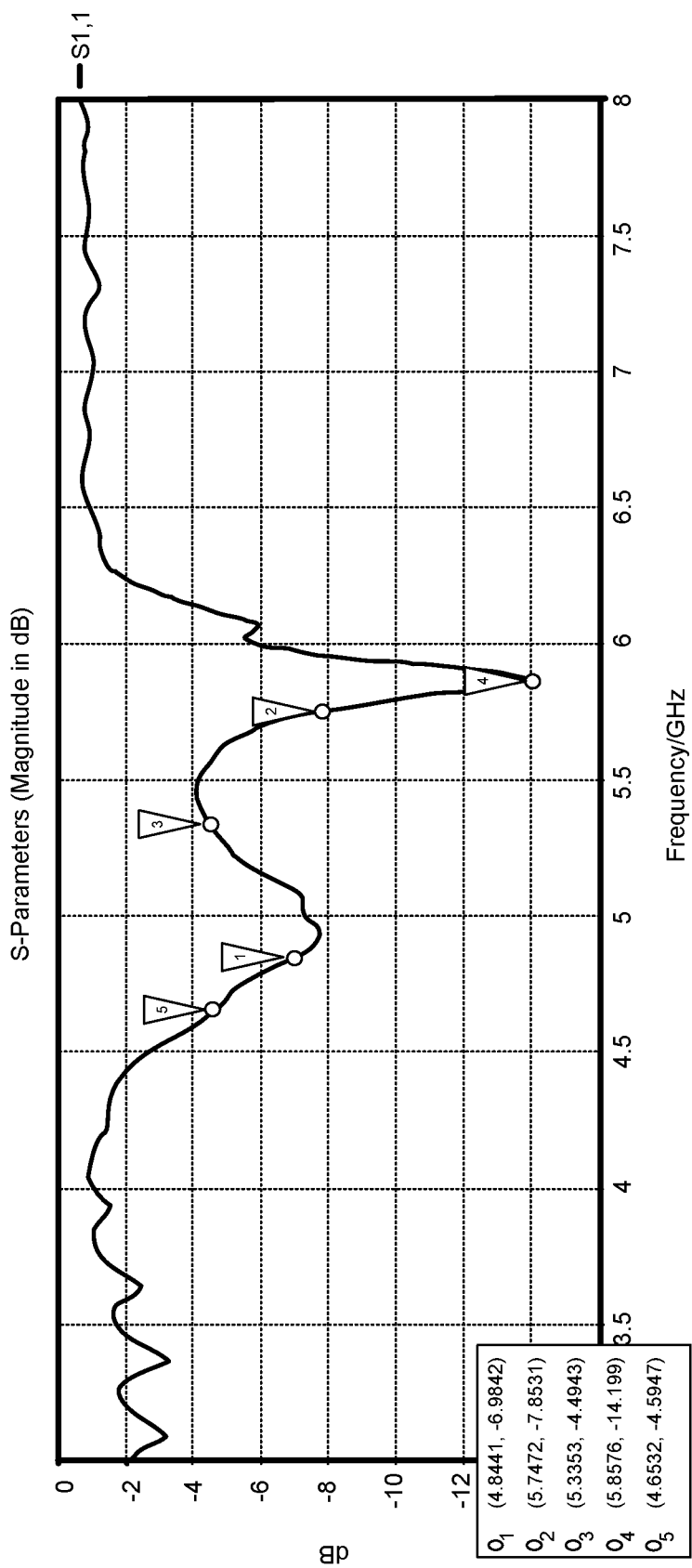
FIG. 6 is a graph illustrating the simulated return loss at a transmission element coupled to a power line.

FIG. 6 is a graph illustrating the simulated return loss of a transmission element mounted on a ten-meter long steel cylinder (to simulate a power line). In the Figure, the X-axis indicates frequency (in GHz) of the transmitted wave, and the Y-axis indicates the return loss in decibels (db). A return loss of 0 db indicates 100% reflection. The graph indicates good transmission at around 5.6 to 6 GHz.

Figure 7:
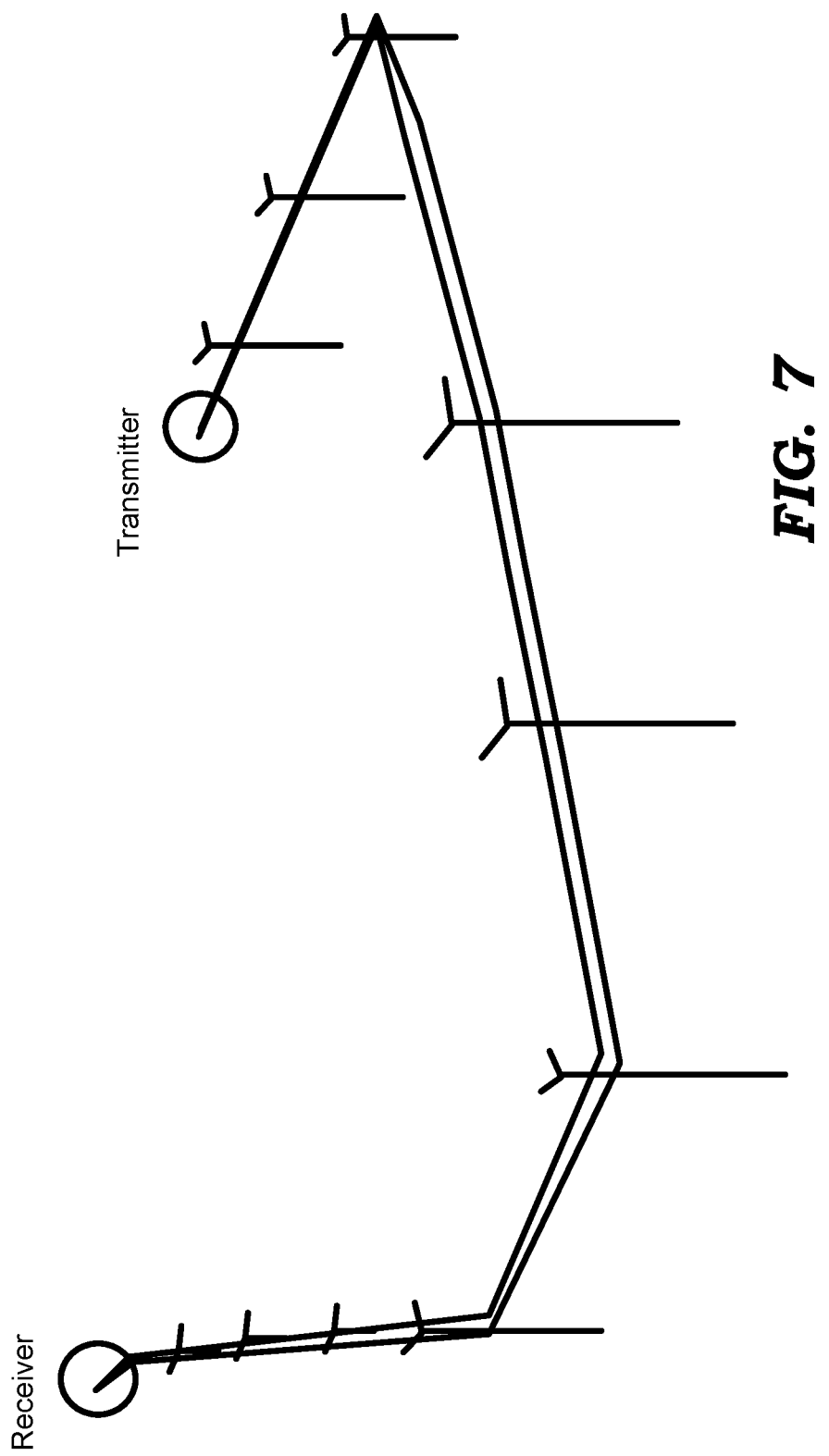
FIG. 7 is a diagram illustrating a section of a power line between a pair of communication elements at a transmitter and a receiver respectively.

FIG. 7 is a diagram illustrating a section of a power line between a pair of transmission elements at a transmitter and a receiver respectively. The power line is used to carry data signals as described above. The data signals are at the surface of the power line and bend along with the power line.

It should be appreciated that receiver element 280 may be implemented with an identical structure as that shown transmission element 270/270B as depicted in FIGS. 2A and 2B. Such components of receiver element 280 operate to receive the TM wave on power line 160, convert the TM wave to TEM wave, and forward to data unit 260 (data sink). Data unit 260 recovers the data elements from TEM wave in a known way.

Further, the communication between transmission element 270 and receiver element 280 can be full-duplex communication provided such communication is supported by data units 201 and 260. In the absence of such capability in data units 201 and 260, elements 270 and 280 may engage in half duplex or simplex communication.

4. Conclusion

References throughout this specification to "one aspect of the present disclosure", "an aspect of the present disclosure", or similar language means that a particular feature, structure, or characteristic described in connection with the aspect of the present disclosure is included in at least one aspect of the present disclosure of the present invention. Thus, appearances of the phrases "in one aspect of the present disclosure", "in an aspect of the present disclosure" and similar language throughout this specification may, but do not necessarily, all refer to the same aspect of the present disclosure. The following examples pertain to above or further embodiments.

Example 1 corresponds to a communication system. The communication system includes a a data source providing a sequence of data elements on a pair of terminals, and a first communication element located at a first portion of a conducting wire to communicate (transmit or receive) the sequence of data elements on a surface of the conducting wire. The first communication element includes a first conductor wrapped around the conducting wire, a first insulator located between the first conductor and the conducting wire, and a conductive structure disposed around the first conductor, the conductive structure having a narrow cross section at one end and outwardly extending to a broader cross section at an other end. A first terminal of the pair of terminals is electrically connected to the first conductor and the second terminal is electrically connected to the conductive structure.

Example 2 corresponds to the communication system of example 1, in which the conducting wire is a power line.

Example 3 corresponds to the communication system of example 1, in which the communication element is a transmission element, wherein the transmission element operates to convert the sequence of data elements in the form of a transverse electromagnetic (TEM) wave to a transverse magnetic (TM) wave, and wherein the TM wave travels on a surface of the conducting wire to a second portion of the conducting wire. The first portion and the second portion are separated by a separation distance.

Example 4 corresponds to the communication system of example 3, in which the conductive structure is electrically isolated from the first conductor surface.

Example 5 corresponds to the communication system of any of examples 3-4, in which the transmission element further includes a second conductor located between the first insulator and the conducting wire.

Example 6 corresponds to the communication system of any of examples 3-5, in which the transmission element further includes a second insulator located between the second conductor and the conducting wire.

Example 7 corresponds to the communication system of any of examples 3-6, in which each of the conducting wire, the first conductor surface, the second conductor surface, the first insulator and the second insulator are all of cylindrical shape and co-axial (having the same axis or concentric) with the conducting wire.

Example 8 corresponds to the communication system of any of examples 3-7, in which the conductive structure is of a cone shape and is also co-axial with the conducting wire.

Example 9 corresponds to the communication system of any of examples 3-8, further including an insulating ring disposed between the conductive structure and the first conductor for the electrical isolation.

Example 10 corresponds to the communication system of example 2, further including a data sink and a second communication element to receive the TM wave and to convert the TM wave to a second TEM wave and to forward the second TEM wave to the data sink, wherein the data sink recovers the sequence of data elements.

Example 11 corresponds to a communication element that includes a first conductor wrapped around a conducting wire, a first insulator to be located between the first conductor and the conducting wire, and a conductive structure to be disposed around the first conductor, the conductive structure having a narrow cross section at one end and outwardly extending to a broader cross section at an other end, wherein said first conductor and said conductive structure are respectively coupled to a first terminal and a second terminal across which a data element is sought to be communicated.

Example 12 corresponds to the communication element of example 11, in which the conducting wire is a power line.

Example 13 corresponds to the communication element of example 12, in which the communication element is a transmission element, wherein the transmission element receives a sequence of data elements from a data source across said first terminal and said second terminal in the form of a transverse electromagnetic (TEM) wave, and converts the TEM wave to a transverse magnetic (TM) wave, wherein the TM wave travels on a surface of the power line to a second end of the power line.

Example 14 corresponds to the transmission element of any of examples 12-13, in which the conductive structure is electrically isolated from the first conductor surface.

Example 15 corresponds to the transmission elements of any of examples 12-14, in which the transmission element further includes a second conductor located between the first insulator and the power line.

Example 16 corresponds to the transmission element of any of examples 12-15, in which the transmission element further includes a second insulator located between the second conductor and the power line.

Example 17 corresponds to the transmission element of any of examples 12-16, in which each of the power line, the first conductor surface, the second conductor surface, the first insulator and the second insulator are all of cylindrical shape and co-axial with the power line.

Example 18 corresponds to the transmission element of any of examples 12-17, in which the conductive structure is of a cone shape and is also co-axial with the power line.

Example 19 corresponds to the transmission element of any of examples 12-18, further including an insulating ring disposed between the conductive structure and the first conductor for the electrical isolation.

Example 20 corresponds to the communication element of example 11, in which the communication element is a receiver element.

While various aspects of the present disclosure have been described above, it should be understood that they have been presented by way of example only, and not limitation. Thus, the breadth and scope of the present disclosure should not be limited by any of the above-described aspects, but should be defined only in accordance with the following claims and their equivalents.

What is claimed is:

1. A communication system comprising:
    a data source providing a sequence of data elements on a pair of terminals;
    a first communication element located at a first portion of a conducting wire to communicate the sequence of data elements on a surface of the conducting wire, the first communication element comprising:
        a first conductor wrapped around the conducting wire;
        a first insulator interposed between the first conductor and the conducting wire; and
        a conductive structure disposed around the first conductor, the conductive structure having a first cross section at one end and outwardly extending to a broader cross section at another end,
    wherein a first terminal of the pair of terminals is electrically coupled to the first conductor and the second terminal is electrically coupled to the conductive structure.

2. The communication system of claim 1, wherein the conducting wire comprises a power line,
    wherein the first communication element is a transmission element,
    wherein the transmission element operates to convert the sequence of data elements in the form of a transverse electromagnetic (TEM) wave to a transverse magnetic (TM) wave, and
    wherein the TM wave travels on a surface of the conducting wire to a second portion of the conducting wire, wherein the first portion and the second portion are separated by a separation distance.

3. The communication system of claim 2, wherein the conductive structure is electrically isolated from the first conductor surface,
    wherein the transmission element further comprises a second conductor located between the first insulator and the conducting wire.

4. The communication system of claim 3, wherein the transmission element further comprises a second insulator located between the second conductor and the conducting wire.

5. The communication system of claim 4, wherein the first conductor, the second conductor, the first insulator and the second insulator are of cylindrical shape and co-axial with the conducting wire.

6. The communication system of claim 5, wherein the conductive structure is of a cone shape and is also co-axial with the conducting wire.

7. The communication system of claim 6, further comprising an insulating ring disposed between the conductive structure and the first conductor for the electrical isolation.

8. The communication system of claim 2, further comprising:
   a data sink; and
   a second communication element to receive the TM wave on the conducting wire, to convert the TM wave to a second TEM wave, and to forward the second TEM wave to the data sink, wherein the data sink recovers the sequence of data elements from the second TEM wave.

9. A communication element for communicating data elements on a conducting wire, the communication element comprising:
   a first conductor capable of being wrapped around the conducting wire;
   a first insulator to be located between the first conductor and the conducting wire; and
   a conductive structure to be disposed around the first conductor, the conductive structure having a narrow cross section at one end and outwardly extending to a broader cross section at an other end,
   wherein said first conductor and said conductive structure are respectively coupled to a first terminal and a second terminal across which a data element is sought to be communicated on the conducting wire.

10. The communication element of claim 9, wherein the conducting wire is a power line.

11. The communication element of claim 10, wherein the communication element is a transmission element, wherein the transmission element receives a sequence of data elements from a data source across said first terminal and said second terminal in the form of a transverse electromagnetic (TEM) wave, and converts the TEM wave to a transverse magnetic (TM) wave,
   wherein the TM wave travels on a surface of the power line to a second end of the power line.

12. The communication element of claim 11, wherein the conductive structure is electrically isolated from the first conductor surface.

13. The communication element of claim 12, wherein the transmission element further comprises a second conductor located between the first insulator and the power line, wherein the transmission element further comprises a second insulator located between the second conductor and the power line.

14. The communication element of claim 13, wherein each of the power line, the first conductor surface, the second conductor surface, the first insulator and the second insulator are all of cylindrical shape and co-axial with the power line.

15. The communication element of claim 14, wherein the conductive structure is of a cone shape and is also co-axial with the power line.

16. The communication element of claim 15, further comprising an insulating ring disposed between the conductive structure and the first conductor for the electrical isolation.

17. The communication element of claim 9, wherein the communication element is a receiver element.

18. A method of communication comprising:
   providing a sequence of data elements on a pair of terminals;
   communicating the sequence of data elements on a surface of a conducting wire, wherein the communicating is performed by a first communication element located at a first portion of the conducting wire, the first communication element comprising:
      a first conductor wrapped around the conducting wire;
      a first insulator interposed between the first conductor and the conducting wire; and
      a conductive structure disposed around the first conductor, the conductive structure having a first cross section at one end and outwardly extending to a broader cross section at another end,
   wherein a first terminal of the pair of terminals is electrically coupled to the first conductor and the second terminal is electrically coupled to the conductive structure.

19. The method of claim 18, wherein the first communication element is a transmission element,
   wherein the transmission element operates to convert the sequence of data elements in the form of a transverse electromagnetic (TEM) wave to a transverse magnetic (TM) wave, and
   wherein the TM wave travels on a surface of the conducting wire to a second portion of the conducting wire, wherein the first portion and the second portion are separated by a separation distance.

20. The method of claim 19, further comprising:
   receiving the TM wave on the conducting wire;
   converting the TM wave to a second TEM wave;
   forwarding the second TEM wave to a data sink, wherein the data sink recovers the sequence of data elements from the second TEM wave, wherein each of the receiving, converting and forwarding are performed by a second communication element; and
   processing the sequence of data elements in the data sink.

* * * * *